Patented Oct. 11, 1927.

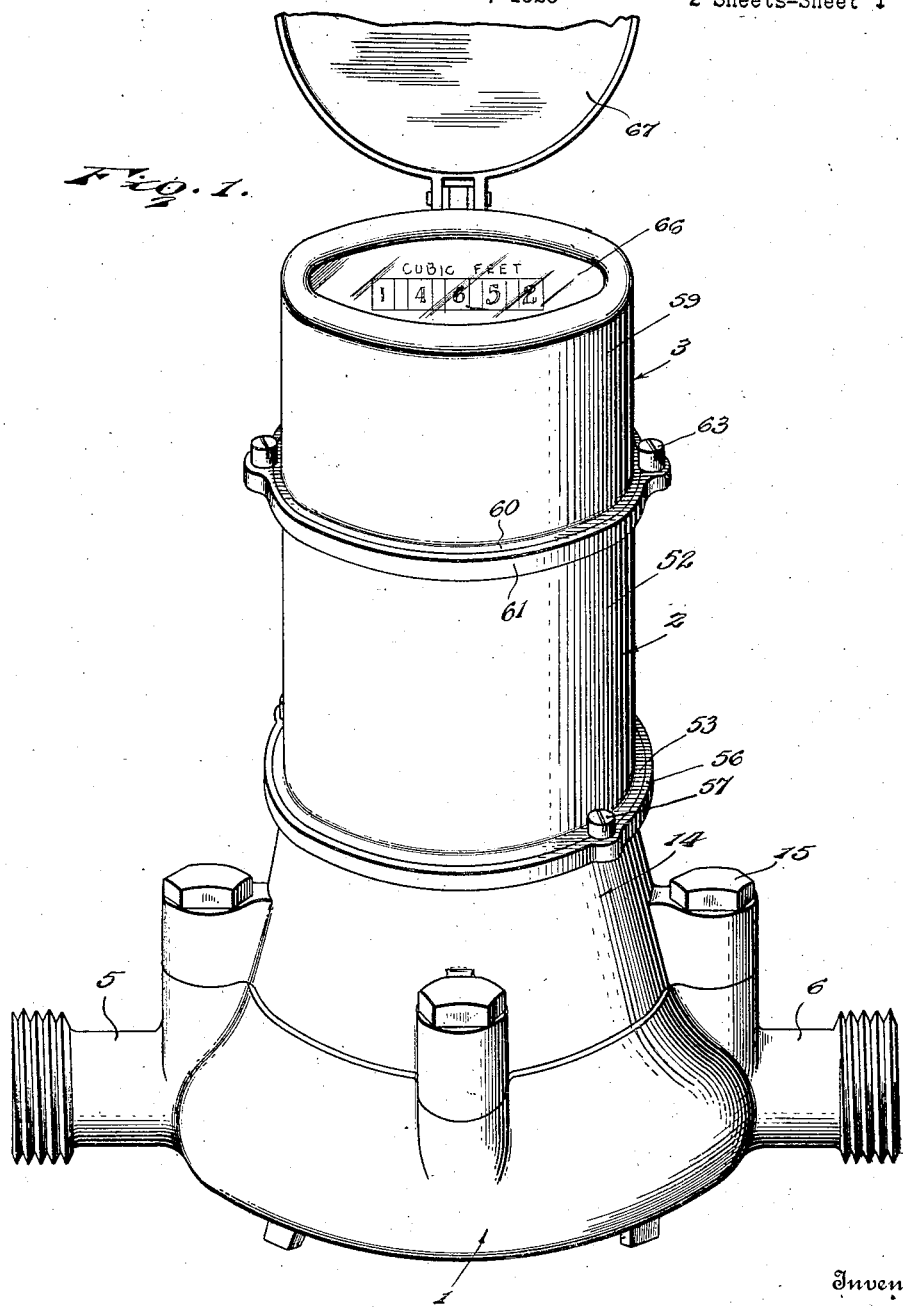

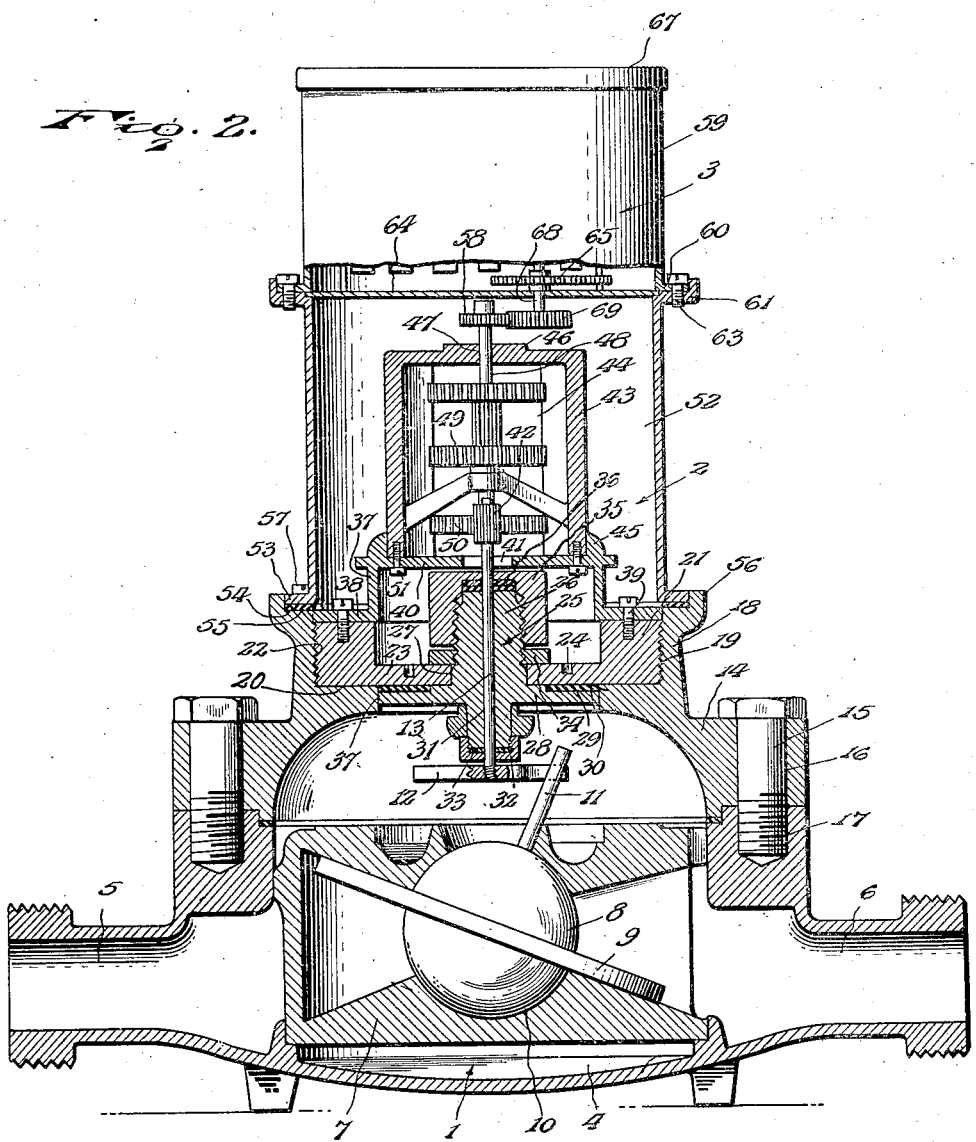

1,645,243

UNITED STATES PATENT OFFICE.

ERNEST G. JUDSON, OF CENTRALIA, WASHINGTON.

WATER METER.

Application filed June 2, 1926. Serial No. 113,225.

This invention relates to improvements in water meters and more particularly that type embodying a piston chamber having an inlet and an outlet, a nutating piston within the piston chamber, and registering mechanism in combination with a train of gearing including an element actuated by the piston for transmitting motion through the train of gearing to the main shaft of the registering mechanism.

The great difficulty which has been experienced in water meters of this type is that water is permitted to come in contact with the train of gearing and, as a consequence there is an early corrosion of the gearing so that the meter either fails to operate or registers inaccurately. Therefore, it is the primary object of the present invention to provide a water meter in which the component units will be so relatively arranged that no water can reach any of the gearing or other operating parts of the meter except the nutating piston and the elements with which it coacts.

Another object of the invention is to so construct and house or mount the component units of the meter that the gear train unit may be readily removed from the remaining parts of the meter, as also the registering unit, to permit of repairs being made to these units without the necessity of shutting off the water supply so that water may be permitted to flow through the meter while the parts are wholly disconnected therefrom.

In the accompanying drawings:

Figure 1 is a perspective view of the meter embodying the invention.

Figure 2 is a view partly in elevation and partly in vertical section, illustrating the arrangement of the several units of the meter.

The meter comprises, generally speaking, a volume measuring unit which embodies the usual nutating piston disc and the other parts ordinarily associated therewith, which unit is indicated by the numeral 1, the motion transmitting gear train unit, which is indicated in general by the numeral 2, and the registering unit which is indicated in general by the numeral 3.

The unit 1 comprises the usual circular bowl-shaped casing 4 open at its top and provided with the usual inlet 5 and outlet 6. The numeral 7 indicates the usual mounting for the spherical body 8 of the piston of the meter, which body carries the usual concentric circumferential piston disc 9, the mounting 7 having the usual spherical seat 10 in which the body 8 is mounted for partial rotary motion in the operation of the piston disc under the influence of the water flowing through the meter from the inlet to the outlet. The body 8 of the piston is provided with the usual pin 11 which coacts with the cam 12 which is fixed at the lower end of a shaft 13 mounted as will presently be explained, the cam element 12 being positioned in the path of movement of the pin 11 so as to be actuated thereby to impart rotary motion to the said shaft 13 in the operation of the piston 9.

The top of the piston casing 1 has a cover member 14 secured thereon by stud bolts 15 fitted through openings 16 therein and threaded into threaded sockets 17 in the top portion of the said casing, and this closure member is provided at its top with a neck 18 which is interiorly threaded as indicated by the numeral 19 and provided interiorly with an annular shoulder 20. The numeral 21 indicates a circular or annular supporting member which is threaded at its periphery, as indicated by the numeral 22, and removably fitted into the neck 18, the said supporting member 21 having its upper side recessed to provide a centrally located web 23 having sockets 24 therein to permit of the application of a spanner wrench whereby it may be threaded into place within the neck of the closure member to bear at its under side snugly against the upper side of the shoulder 20, as clearly shown in Figure 2 of the drawings. The shaft 13 is mounted in a stuffing box which is indicated in general by the numeral 25 and which is supported entirely by the web 23 of the supporting member 21. This stuffing box comprises a body 26 which is snugly fitted through an opening 27 formed centrally in the web 23 of the supporting member, and the body is provided with an outstanding circumscribing flange 28 recessed peripherally at its upper side, as at 29, to receive a packing washer 30 clamped between the said peripheral portion of the flange and the under side of the web of the supporting member 21. The body 25 of the stuffing box is formed axially with a bore 31 in which the shaft 13 is rotatably mounted and a cap 32 is threaded onto the lower end of the body 26 and houses a packing gasket 33 for the purpose of excluding water from the bore 31, the cam element 12 being located immediately below the said cap 32. The body 26 of the stuffing box is exteriorly threaded at its portion which projects above the web 23 of the supporting member 21, and a nut 34 is threaded onto this portion of the body and is tightened to bear against the upper side of the web 23 so as to securely clamp the body of the stuffing box in place. A cap member 35 is threaded onto the portion of the body 26 above the nut 34 and one or more packing washers 36 are arranged within the cap and clamped thereby against the upper end of the said body 26 so as to further exclude water and prevent the same issuing through the upper end of the bore 31. At this point it will be evident that the stuffing box 25 constitutes means for effectually excluding water from that portion of the meter which is located above the supporting member 21 and this is of importance in view of the fact that the gear train unit is, as will now be explained, mounted above the said supporting member 21 and the closure 14 for the casing 1, and is bodily removable to permit of repairs or replacements being made without in any way disturbing the said closure 14 or shaft 13 and without the necessity of cutting off the supply of water to the meter. It will also be evident that while the stuffing box construction illustrated and described is a highly efficient one for the purpose, a water-excluding means of some other construction might be employed in lieu thereof, the main object being to exclude water from the interior of the meter above the said closure 14 of the casing 1. It will be observed, however, that an exceptionally fluid-tight connection is provided by the use of the stuffing box construction and that, as regards the flange 28, water is further excluded from the space above the flange by reason of the fact that said flange fits snugly in an opening 37 which is provided in the top of the closure 14 and defined by the inner or circumferential surface of the shoulder 20. It will also be observed that the nut 34, when tightened, has its upper side slightly spaced from the lower side of the cap member 35 so that the cap member may be suitably adjusted to compress the washers 36 without being limited in its adjustment by the said nut 34.

The gear train unit 2 includes a base member 37 having an outstanding circumferential flange 38 which is disposed upon the upper side of the stuffing box supporting member 21 and is held in place by screws 39, and the said base member is provided at its top with a web 40 having an opening 41 therein located directly above the cap 35 of the stuffing box assemblage and concentric to the shaft 31, the upper end of the shaft extending upwardly through the said opening and carrying a pinion 42. The housing 43, which is open at its side, as indicated by the numeral 44, is disposed upon the upper side of the web 40 and the web is provided with an upstanding flange 45 surrounding the lower end of the said housing. The housing includes a top 46 having a bearing opening 47 for a shaft 48 which constitutes one element of the gear train which is indicated by the numeral 49, and which train further includes a gear 50 in mesh with the pinion 42, motion being in this manner transmitted from the shaft 13 to the shaft 48. Securing screws 51 are fitted through the web 40 and are threaded into the lower end of the housing and serve to removably secure the housing in place upon the base member 37. A cylindrical casing section 52 is provided at its lower end with a circumscribing flange 53 which is disposed upon a packing ring 54 in turn seated upon a shoulder 55 at the upper side of the neck 18 of the closure 14, the said neck having an upstanding flange 56 surrounding the said packing element and the periphery of the flange 53. Screws 57 are fitted through the flange 54 and threaded through the shoulder 55 and serve to removably secure the cylindrical casing section 52 in place upon the closure 14 and it will be evident at this point that by removing these screws the casing section may be bodily removed and that, likewise, by removing the screws 39, the base member 37 and the gear train supported thereby within the housing 43 may be bodily separated from the supporting member 21. This separation of the gear train unit 2, in its entirety, from the closure 14 of the casing 4, is effected without in any way disturbing the shaft 13, the stuffing box assemblage 25, and the pinion 42, the opening 41 being of a diameter to adapt the web 40 of the base member 37 to clear the said pinion as the gear unit is lifted. The shaft 48 has fixed upon its upper end a pinion 58 which is located above the top portion 46 of the housing 43.

The registering unit 3 comprises a cylindrical casing section 59 having a flange 60 resting upon an outstanding flange 61 upon the upper end of the cylindrical casing section 52, screws 63 being secured through the flanges 60 and 61 so as to separably connect the casing section 59 with the casing section 52. The numeral 64 indicates a disc which is disposed to close the bottom of the casing section 59, and the usual registering gearing and mechanism, indicated in general by the numeral 65, is housed within the said casing section 59, the register dials being visible through the usual glass pane 66 mounted in the top of the casing section and normally covered by a hinged lid 67. This gearing as well as the gear train 49 constitute no part of the present invention, being of the ordinary type. However, the registering gearing 65 includes a shaft 68 which extends downwardly through the disc 64 and has fixed upon it a gear 69 which is in mesh with the pinion 58. It will now be evident that if any substitution or replacement of parts of the unit 3 is required, or any repairs thereto become necessary, it is only necessary to remove the screws 63 whereupon this entire unit may be separated from the unit 2, and, as previously explained, the unit 2 may be bodily separated from the supporting member 21 and cover 14 of the casing 4 and this disassemblage of the parts may be effected without any necessity of cutting off the flow of water through the meter or without any liability of leakage of the water when the units are removed. It will be understood that the casing section 52 of the unit 2 may be supplied with lubricant and that it will be unnecessary to frequently replenish the supply as is required in other meter constructions of this type, inasmuch as water is prevented from entering the interior of the said casing section 52, due to the provision of the stuffing box assemblage 25 in the location shown and described.

Having thus described the invention, what I claim is:

In a water meter, in combination with a volume measuring unit including a casing having a top and current-actuated volume measuring means within the casing including a motion transmitting element, the top having an interiorly threaded neck, a supporting member threaded into the neck and having an opening therein, a stuffing box seated in the opening and preventing water escaping from said casing through said top, caps upon the upper and lower ends of the stuffing box for maintaining packing upon the respective ends thereof, a nut engageable upon the stuffing box to maintain the same interlocked with the supporting member, a shaft rotatably journaled in the said stuffing box and caps, an element upon the shaft within the said casing engageable by the motion transmitting element of the current-actuated mechanism of the said volume measuring unit, a gear element at the upper end of the shaft above the stuffing box, a casing section separably secured to and mounted upon the top of the casing of the volume measuring unit, a gear train housed within the said casing section and supported upon the said supporting member and including a gear meshing with the pinion and laterally disposed with respect thereto whereby the said gear train may be bodily separated from the volume measuring unit, the said gear train further including a shaft and a gear element thereon, and a registering unit separably connected with and mounted upon the casing section and including a gear element coacting with the gear element upon the last mentioned shaft.

In testimony whereof I affix my signature.

ERNEST G. JUDSON. [L. S.]